Patented Sept. 17, 1929

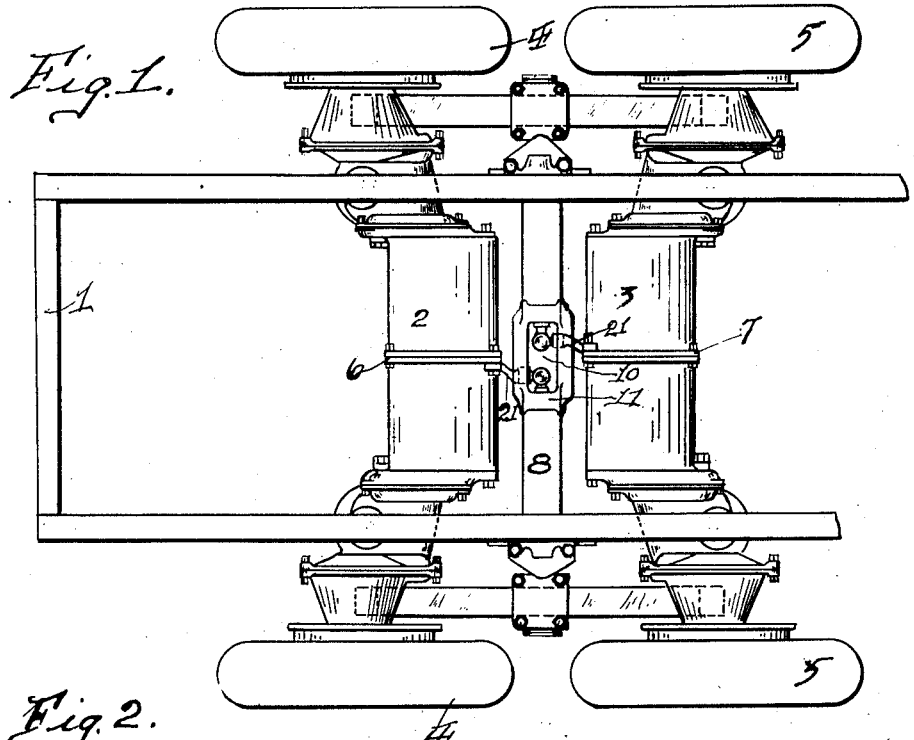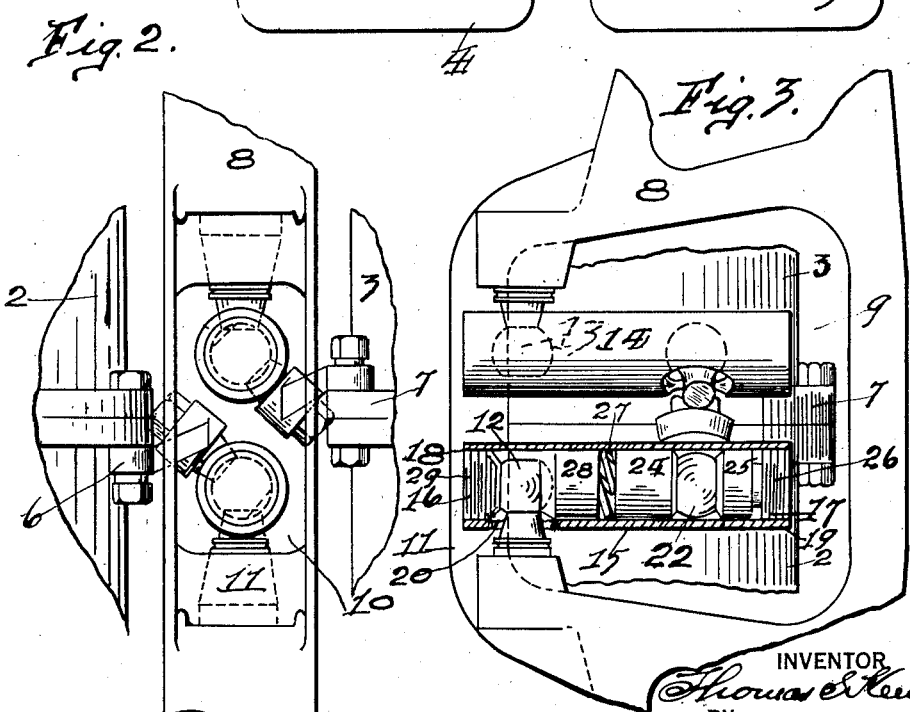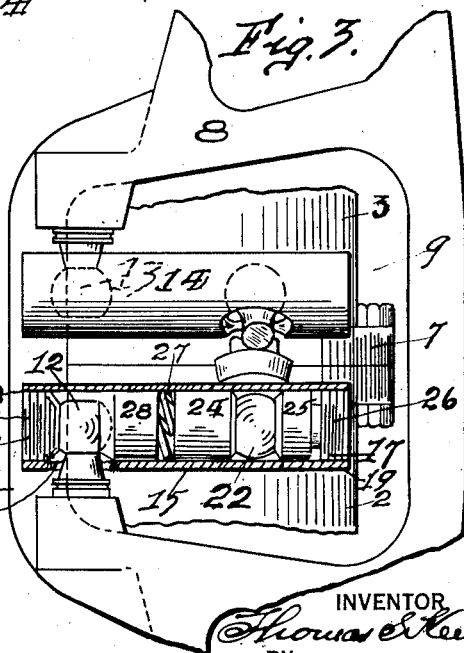

1,728,890

UNITED STATES PATENT OFFICE

THOMAS S. KEMBLE, OF LAKEWOOD, OHIO, ASSIGNOR TO UNIVERSAL GAS ELECTRIC COMPANY, OF LAWRENCE, KANSAS, A CORPORATION OF DELAWARE

TORQUE SYSTEM FOR FOUR-WHEEL DRIVES FOR AUTO BUSSES, TRUCKS, ETC.

Original application filed July 2, 1924, Serial No. 723,772. Divided and this application filed June 13, 1927. Serial No. 198,659.

My invention, as set forth in the hereinafter contained description, is a divisional application of my copending application, Serial No. 723,772, filed July 2, 1924, and relates to that class of automobiles provided with six wheels, two pairs of which operate as driving wheels, and has for its object to provide for the location of the motor links close together and in the same crosswise plane, which eliminates the torsion in the cross member and reduces the bending moment to a minimum, because the torque reactions are in opposite directions, thus tending to neutralize one another.

My invention has for its further object, to provide a construction in which the balls on the motor links will be in a vertical plane crosswise of the vehicle and through the axis of the cross member of the chassis frame, thus avoiding any torsion in the cross member.

A further object is to locate these balls very close together, thus reducing to a minimum the bending moments in the cross member, as this construction will cause the reactions to neutralize one another to the greatest extent practice will permit, for, as will be fully understood by those familiar with the art, when the reaction on one axle, from braking the vehicle or from the torque produced by driving, is upward, that on the other axle is always downward.

It is also essential, to the proper functioning of this system, that the torque arm shall constrain the axle assembly only from rotating about the center line of the wheels, but that it shall not constrain the axle from other motion, lest it disturb the otherwise flexible functions of the springs.

My means of accomplishing the foregoing objects may be more readily understood by having reference to the accompanying drawings, which are hereunto annexed and are a part of this specification, in which—

Fig. 1 is a plan view of a four-wheel drive, attached to a fragmentary portion of the chassis frame of an auto bus or truck;

Fig. 2 is an enlarged detail view in plan, of the cross member of the frame, showing the motor links and ball connections of my improved torque system; and Fig. 3 is an end elevation of the same, part being shown in vertical section to more adequately disclose the details of my invention.

Similar reference numerals refer to similar parts throughout the entire description.

The frame 1 of the chassis (only a fragmentary portion being shown, as obviously it forms no part of my invention,) has two pairs of motors 2 and 3, which are connected by suitable gear trains (not shown) to wheels, two pairs of wheels 4 and 5. The end plates 6 and 7 of the motors 2 and 3 are connected to a cross member 8 of the chassis frame by my improved torque system, which is constructed as follows:

The cross member 8 is formed with a central opening 9 which extends through its vertical web, as clearly seen in Fig. 3, and another opening 10 in its upper horizontal portion 11. Secured to the cross member 8, adjacent the upper part of the opening 9, are balls 12 and 13. The centers of these balls 12 and 13 must be located in the same vertical plane and also in the axis of the cross member 8, and should be as near together as is practicable. The motor links 14 and 15 are constructed, as clearly seen in the sectional view in Fig. 3, of a cylindrical sleeve, which is provided with internal threads 16 and 17 at its respective ends 18 and 19. An opening 20 is provided adjacent the top of the links or sleeves 14 and 15, for the reception of the balls 12 and 13 carried by the cross member 8. I secure a bracket 21 to each of the frames 6 and 7 of the motors 2 and 3, each of which carries a ball 22, similar in shape and location to the balls 12 and 13. Openings are also formed in the links or cylindrical sleeves 14 and 15, for the entrance of the balls 22. Sockets for the balls 22 are formed by two plugs 24 and 25, which are slidably fitted inside the links or sleeves 14 and 15, and which have concave cavities turned on their faces adjacent the balls 22 which fit the curvature thereof. A screw-threaded plug 26 is inserted in the threads 17 in the lower end 19 of each of the sleeves 14 and 15, and serves to hold the plug 25 in place. A coil spring 27 is placed upon the plug 24, and a plug 28, which is similar to the plug 24, is placed thereon. A screw-threaded plug 29, which has its inner end turned to fit the balls 12 and 13, is screwed into the threads 16 in the sleeves 14 and 15 and abuts the balls 22, providing for adjustment, while the coil spring 27 serves to take up the wear and keep the inner socket plugs 24 and 28 pressing against the balls 22.

It will be apparent from the foregoing, that by the construction just described I furnish a torque system which will fully accomplish the objects sought by me, as hereinbefore set forth.

Having thus described my invention, what I regard as new, and desire to secure by Letters Patent of the United States, is:

1. In a vehicle, a four-wheel drive, comprising two axles arranged in tandem, a cross-member having a vertical web secured to the chassis intermediate said axles, there being a central opening in said vertical web, arms secured to said cross-member adjacent its top, balls on said arms having their centers located in the same vertical plane and also in the axis of the cross-member, a bracket secured to each axle, a ball carried by each bracket, the center of said balls also being in the same vertical plane as the first mentioned balls and also in the axis of the cross-member, a pair of cylindrical sleeves, adjustable sockets therein which fit said balls, there being openings in said sleeves to admit said balls.

2. In a vehicle, a four-wheel drive, comprising two axles arranged in tandem, a cross-member having a vertical web secured to the chassis intermediate said axles, there being a central opening in said vertical web, arms secured to said cross-member adjacent its top, balls on said arms having their centers located in the same vertical plane and also in the axis of the cross-member, a bracket secured to each axle, a ball carried by each bracket, the center of said balls also being in the same vertical plane as the first mentioned balls and also in the axis of the cross-member, a pair of cylindrical sleeves, adjustable sockets therein which fit said balls, there being openings in said sleeves to admit said balls, and a coil spring intermediate said sockets.

3. In a vehicle, a four-wheel drive, comprising two axles arranged in tandem, a cross-member having a vertical web secured to the chassis intermediate said axles, there being a central opening in said vertical web, arms secured to said cross-member adjacent its top, balls on said arms having their centers located in the same vertical plane and also in the axis of the cross-member, a bracket secured to each axle, a ball carried by each bracket, the center of said balls also being in the same vertical plane as the first mentioned balls and also in the axis of the cross-member, a pair of cylindrical sleeves mounted close together, adjustable sockets therein which fit said balls, there being openings in said sleeves to admit said balls.

4. In a vehicle, a four-wheel drive, comprising two axles arranged in tandem, a cross-member, arms secured to said cross-member adjacent its top, balls on said arms having their centers located in the same vertical plane and also in the axis of the cross-member, a bracket secured to each axle, a ball carried by each bracket, the center of said balls also being in the same vertical plane as the first mentioned balls and also in the axis of the cross-member, a pair of cylindrical sleeves mounted close together, and adjustable sockets therein which fit said balls, there being openings in said sleeves to admit said balls.

THOMAS S. KEMBLE.